(12) United States Patent
Grion et al.

(10) Patent No.: US 9,684,085 B2
(45) Date of Patent: Jun. 20, 2017

(54) WAVEFIELD MODELLING AND 4D-BINNING FOR SEISMIC SURVEYS FROM DIFFERENT ACQUISITION DATUMS

(71) Applicant: CGG SERVICES SA, Massy (FR)

(72) Inventors: Sergio Grion, Horley (GB); Ross Haacke, Reigate (GB)

(73) Assignee: CGG SERVICES SAS, Massy (FR)

( * ) Notice: Subject to any disclaimer, the term of this patent is extended or adjusted under 35 U.S.C. 154(b) by 620 days.

(21) Appl. No.: 14/071,708

(22) Filed: Nov. 5, 2013

(65) Prior Publication Data

US 2014/0198605 A1 Jul. 17, 2014

Related U.S. Application Data

(60) Provisional application No. 61/752,626, filed on Jan. 15, 2013.

(51) Int. Cl.
*G01V 1/00* (2006.01)
*G01V 1/30* (2006.01)
*G01V 1/38* (2006.01)

(52) U.S. Cl.
CPC .............. *G01V 1/308* (2013.01); *G01V 1/38* (2013.01); *G01V 2210/6122* (2013.01); *G01V 2210/671* (2013.01)

(58) Field of Classification Search
CPC ...................................................... G01V 1/308
USPC ...... 367/36, 38, 71, 73; 702/14, 16; 364/421
See application file for complete search history.

(56) References Cited

U.S. PATENT DOCUMENTS

| | | | | |
|---|---|---|---|---|
| 4,330,873 A * | 5/1982 | Peterson | .................. | G01V 1/28 367/60 |
| 8,332,154 B2 * | 12/2012 | Chu | ......................... | G01V 1/30 367/38 |
| 8,451,683 B2 * | 5/2013 | Chu | ......................... | G01V 1/30 367/38 |
| 9,146,329 B2 * | 9/2015 | Houck | ...................... | G01V 1/28 |
| 9,229,122 B2 * | 1/2016 | Haacke | .................. | G01V 1/366 |
| 2008/0170468 A1 | 7/2008 | Brain et al. | | |

(Continued)

FOREIGN PATENT DOCUMENTS

EP 2743734 A2 6/2014

OTHER PUBLICATIONS

Zhang, Qi, Robert R. Stewart, and Zandong Sun. "3-D VSP: Survey design and processing." CREWES project report 7 (1995): 1-24.*

(Continued)

*Primary Examiner* — James Hulka
*Assistant Examiner* — Jonathan Armstrong
(74) *Attorney, Agent, or Firm* — Patent Portfolio Builders PLLC

(57) ABSTRACT

A method for maximizing a repeatability between a base seismic survey and a monitor seismic survey of a same surveyed subsurface during a 4-dimensional (4D) project. The method includes receiving first seismic data associated with the base seismic survey; receiving second seismic data associated with the monitor seismic survey, wherein the monitor seismic survey is performed later in time than the base seismic survey; estimating subsurface reflection-points and incidence angles; determining 4D-binning based on the estimated subsurface reflection-points and incidence angles; and maximizing the repeatability between the first seismic data and the second seismic data by using the 4D-binning.

16 Claims, 9 Drawing Sheets

(56) References Cited

U.S. PATENT DOCUMENTS

| | | |
|---|---|---|
| 2008/0259726 A1 | 10/2008 | van Manen et al. |
| 2009/0290449 A1 | 11/2009 | Smith et al. |
| 2014/0172307 A1* | 6/2014 | Svay ..................... G01V 1/308 702/14 |

OTHER PUBLICATIONS

Zhang, Qi, et al. "Analysis of the Blackfoot 3C-3D VSP survey." The CREWES Project Research Report, Chpt 40 (1996).*

Boelle, Jean-Luc, et al. "Ocean bottom node processing in deep offshore environment for reservoir monitoring." 2010 SEG Annual Meeting. Society of Exploration Geophysicists, 2010.*

Stopin, A., et al. "Results from the First OBS to OBS Time-lapse Survey in the Mars Basin." 73rd EAGE Conference and Exhibition incorporating SPE EUROPEC 2011. 2011.*

Boelle, J-L., et al. "A large-scale validation of OBN technology for time-lapse studies through a pilot test, deep offshore Angola." The Leading Edge 31.4 (2012): 397-403.*

Ocean Bottom Node Acquisition. Mar. 8, 2012. Bjorn Olofsson (SeaBird Exploration, on behalf of Fugro).*

Haacke, R. Ross, et al. "4D processing for towed streamers and sparse ocean-bottom nodes." 2013 SEG Annual Meeting. Society of Exploration Geophysicists, 2013.*

Svay, Julie, et al. "4D Repeatability of Reservoir Illumination: Quality Control and Support to Re-Shoot Decision." 2013 SEG Annual Meeting. Society of Exploration Geophysicists, 2013.*

Theriot, Christian, Wai-Fan Wong, and Chris Corcoran. "Qualitative 4D: matching ocean bottom seismic to towed streamer data." 2015 SEG Annual Meeting. Society of Exploration Geophysicists, 2015.*

International Search Report mailed Aug. 1, 2014, in related International Application No. PCT/EP2014/050624.

Written Opinion mailed Aug. 1, 2014, in related International Application No. PCT/EP2014/050624.

J.-L. Boelle, et al., "A Large-Scale Validation of OBN Technology for Time-Lapse Studies Through a Pilot Test, Deep Offshore Angola", The Leading Edge, Apr. 2012, pp. 397-403.

L. Bovet, et al., "Ocean Bottom Nodes Processing: Reconciliation of Streamer and OBN Data Sets for Time Lapse Seismic Monitoring. The Angolan Deep Offshore Experience.", SEG Denver 2010 Annual Meeting, pp. 3751-3755, SEG.

K. Duffaut, et al., "Processing of OBC and Surface Seismic Data for Reservoir Monitoring at the Statfjord Field", EAGE 65th Conference & Exhibition—Stavanger, Norway, Jun. 2-5, 2003.

D. Lecerf, et al., "WAZ Mirror Imaging with Nodes for Reservoir Monitoring—Dalia Pilot Test", 72nd EAGE Conference & Exhibition incorporating SPE EUROPEC 2010, Barcelona, Spain, Jun. 14-17, 2010.

C.P.A. Wapenaar, et al., "Elastic Redatuming of Multicomponent Seismic Data", 52nd EAEG meeting, Copenhagen, May-Jun. 1990, Geophysical Prospecting, pp. 265-482, 40.

* cited by examiner

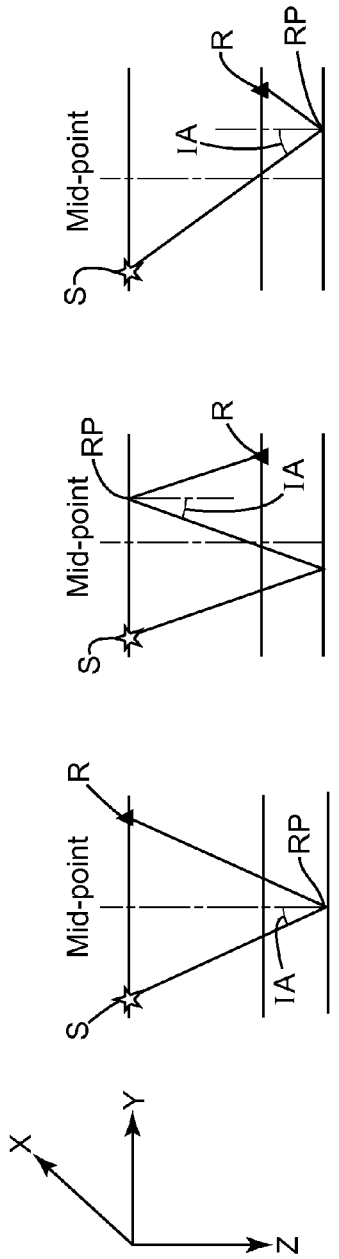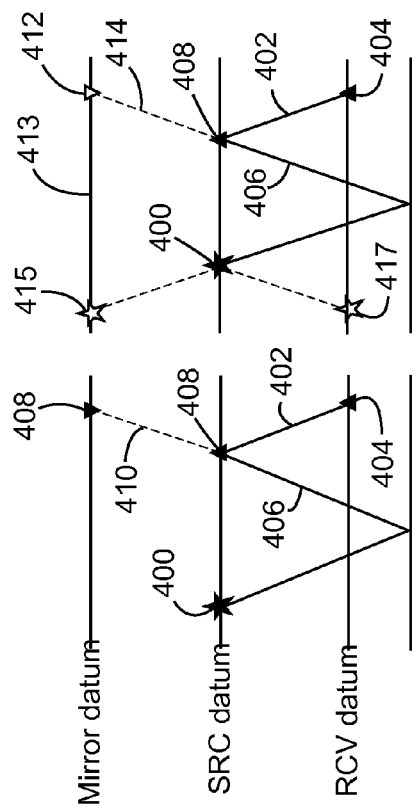
Figure 3A
Figure 3B
Figure 3C
Figure 4A
Figure 4B

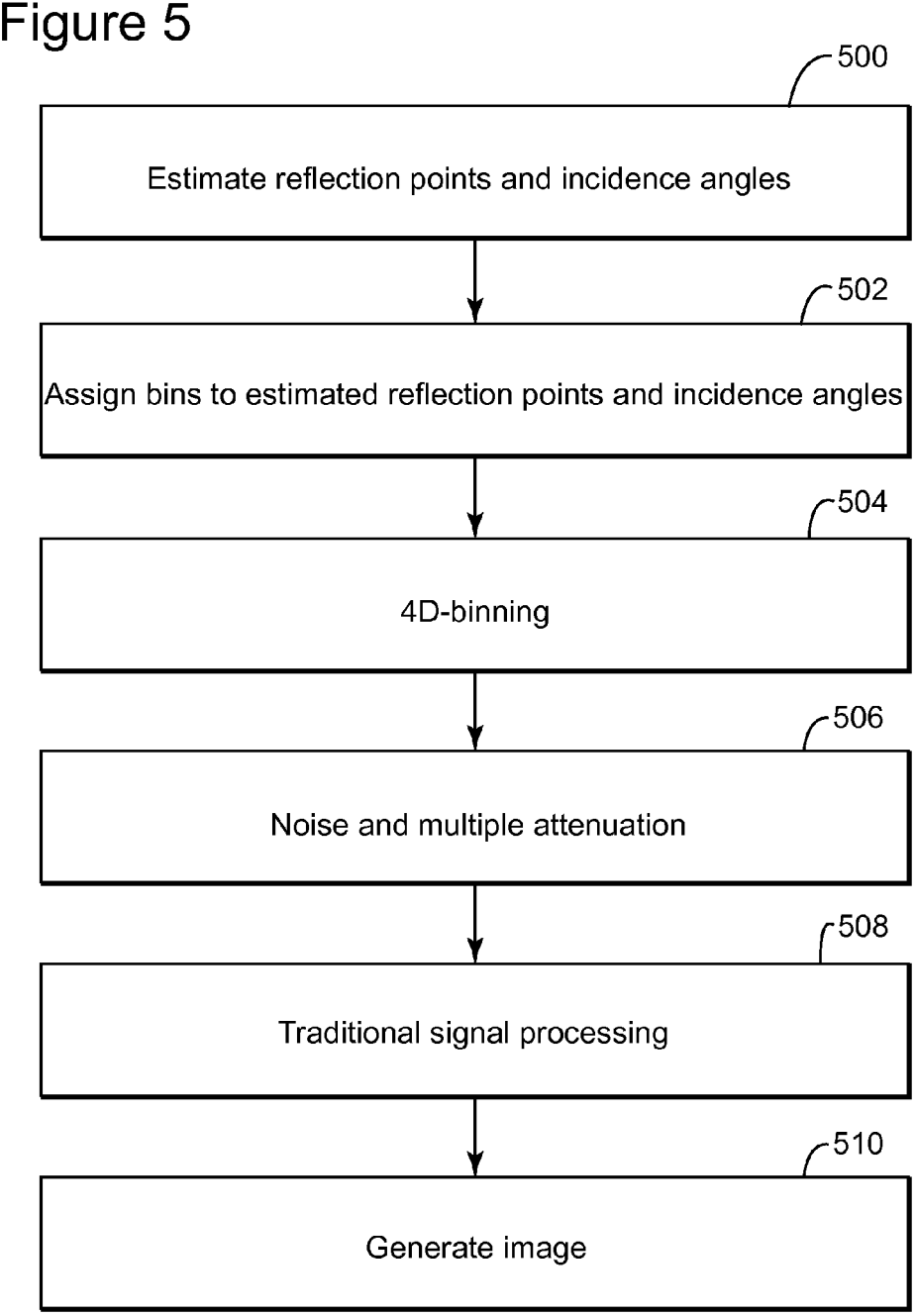

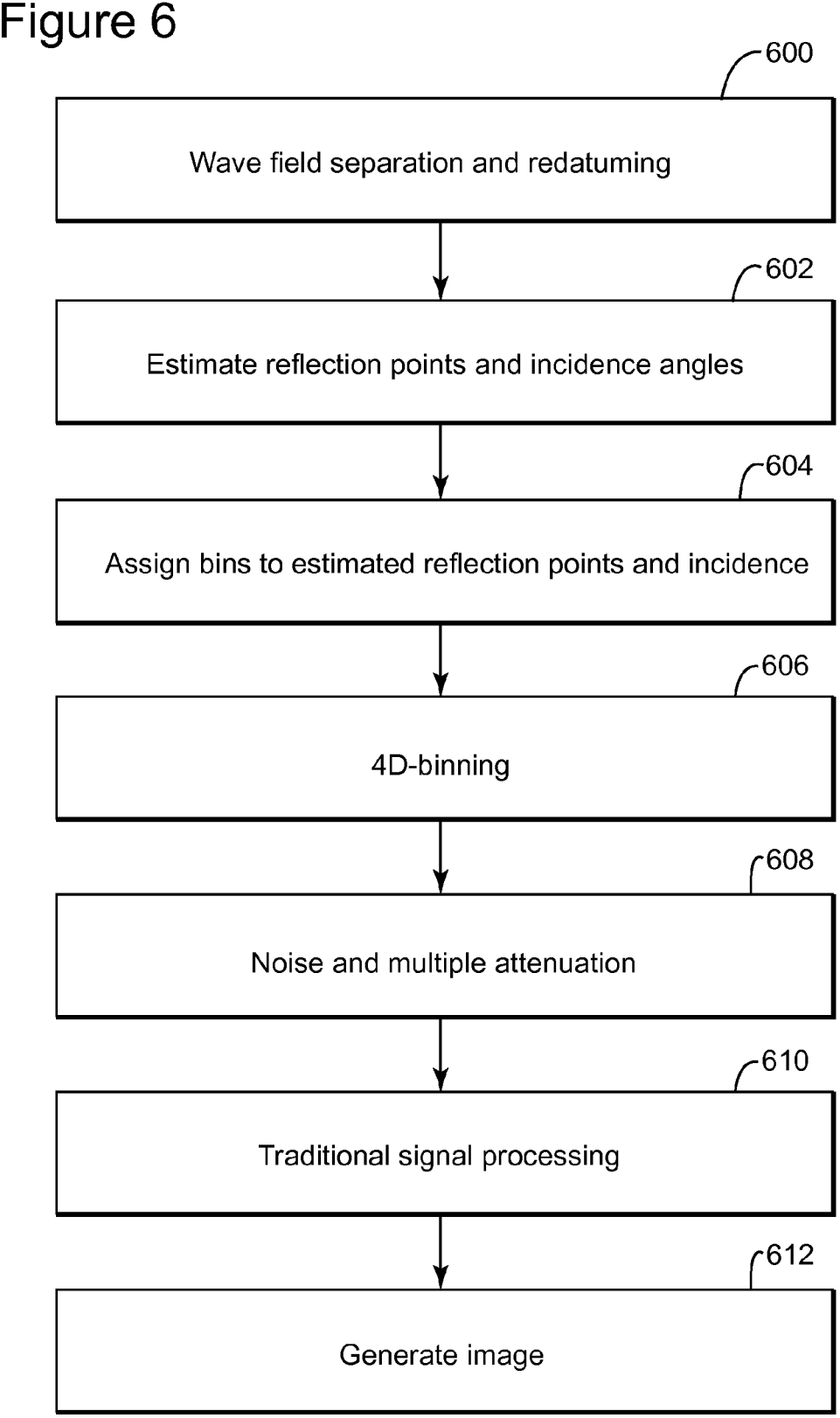

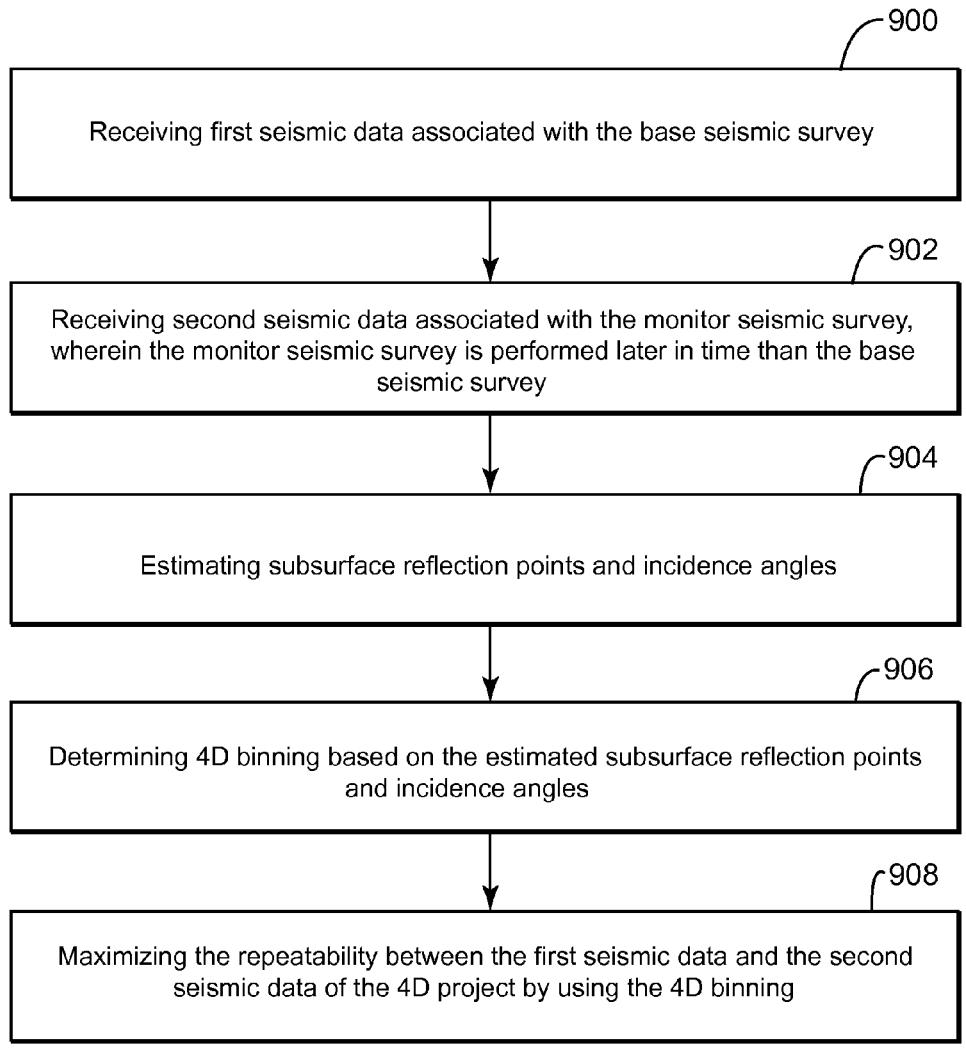

WAVEFIELD MODELLING AND 4D-BINNING FOR SEISMIC SURVEYS FROM DIFFERENT ACQUISITION DATUMS

BACKGROUND

Technical Field

Embodiments of the subject matter disclosed herein generally relate to methods and systems and, more particularly, to mechanisms and techniques for redatuming and binning seismic data collected with different datums for improving a final image of a surveyed subsurface in a time-lapse or 4D project.

Discussion of the Background

Marine seismic data acquisition and processing generate an image of a geophysical structure (subsurface) under the seafloor. While this image/profile does not provide a precise location for oil and gas reservoirs, it suggests, to those trained in the field, the presence or absence of oil and/or gas reservoirs. Thus, providing a high-resolution image of the subsurface is an ongoing process for the exploration of natural resources, including, among others, oil and/or gas.

During a seismic gathering process, as shown in FIG. 1, a vessel 10 tows an array of seismic receivers 11 located on streamers 12. The streamers may be disposed horizontally, i.e., lying at a constant depth relative to the ocean surface 14, or may have spatial arrangements other than horizontal, e.g., variable-depth arrangement. The vessel 10 also tows a seismic source array 16 configured to generate a seismic wave 18. The seismic wave 18 propagates downward, toward the seafloor 20, and penetrates the seafloor until, eventually, a reflecting structure 22 (reflector) reflects the seismic wave. The reflected seismic wave 24 propagates upward until it is detected by receiver 11 on streamer 12. Based on this data, an image of the subsurface is generated.

Alternatively, ocean bottom cables (OBC) or ocean bottom nodes (OBN) and seismometers (OBS) may be used to record the seismic data. FIG. 2 shows an OBC 30 that includes plural receivers 32 distributed on the ocean bottom 20. The plural receivers 32 are connected to each other with a cable 33 that may also be connected to a data collection unit 34. Various means (e.g., underwater vehicle) may be used to retrieve the seismic data from the data collection unit 34 and bring it on the vessel 10 for processing.

One or more of the above-noted techniques may be used to monitor a producing reservoir. For these instances, the goal of 4D processing is to determine how and where earth properties change by evaluating differences in processed seismic data acquired at different times, usually before (i.e., the baseline survey) and after (i.e., the monitor survey) a period of fluid production from a petroleum reservoir. Success of 4D processing depends on the accuracy with which differences in acquisition or subsurface changes not related to fluid production are compensated for during data processing and imaging, in order that 4D noise (the difference of migrated images not related to fluid production) is kept reasonably quiet. Relevant sources of 4D noise include differences in wavefield sampling caused by different survey acquisition parameters between baseline and monitor.

An important step of 4D processing is to select subsets of the base and monitor data that maximize the similarity of information content and wavefield sampling between them. It is common to achieve this by 4D-binning (e.g., U.S. Patent Application Publication No. 2008/0170468A1, herein "'468"), wherein traces from the base and monitor surveys are selected for further processing if they satisfy a set of criteria designed to assess their degree of similarity. These 4D-binning criteria usually assess similarity using surface attributes of the baseline and monitor surveys, for example the geographic position of traces defined by shot and receiver locations, or by mid-point location and/or offset and/or azimuth. Note that geographic position in this context means the X and Y coordinates of the sources and receivers in a plane substantially parallel with the earth's surface or ocean bottom and does not include a depth (Z coordinate) of the sources and/or receivers.

The traditional approach of '468 works well when the source and receiver datums of the baseline survey are the same as those in the monitor survey, in which case similarity of surface attributes is an accurate proxy for similarity of wavefield sampling and information content of the two datasets. One example of this is a towed-streamer baseline survey and a towed-streamer monitor survey, in which shots and receivers lie on an approximately constant datum near the sea-surface.

However, when the shot or receiver datums of the baseline survey are different than those of the monitor survey, similarity of surface attributes (e.g., shot and receiver positions) no longer represents similarity of information content or of wavefield sampling because the reflection points RP and incidence angles IA of the two datasets are different for the same shot and receiver locations as illustrated in FIGS. 3A-C. In this sense, FIGS. 3A-C show a source S and a receiver R having a same offset distance (distance between the source S and the receiver R in the XY plane) but the reflection points RP and incidence angles IA do not spatially coincide. FIG. 3A illustrates a towed-streamer geometry, FIG. 3B illustrates OBN geometry with the downgoing wavefield and FIG. 3C illustrates the OBN geometry with the upgoing wavefield.

This problem was recognized for 4D processing of towed-streamer and ocean-bottom data by Bovet et al. (2010, "Ocean bottom node processing reconciliation of streamer and OBN datasets for time lapse seismic monitoring: the Angolan deep offshore experience," SEG Expanded Abstracts, 3751-3755), Lecerf et al. (2010, "WAZ mirror imaging with nodes for reservoir monitoring, Dalia pilot test," Expanded Abstracts of the $72^{nd}$ EAGE Conference and Exhibition) and Boelle et al. (2012, "A large-scale validation of OBN technology for time-lapse studies through a pilot test, deep offshore Angola," The Leading Edge, 31, 397-403). The solution proposed by these documents is simply to image the downgoing part of the ocean-bottom wavefield (after wavefield separation) since its subsurface properties are closer to those of the towed-streamer wavefield for the same source and receiver locations. However, these approaches still suffer from mismatching between the base and monitor datasets.

Thus, there is a need for a new method that accounts for the unrepeatable wavefield sampling prior to applying known 4D data processing techniques.

SUMMARY

According to an exemplary embodiment, there is a method for increasing a similarity between a base seismic survey and a monitor seismic survey of a same surveyed subsurface during a 4-dimensional (4D) project. The method includes receiving first seismic data associated with the base seismic survey; receiving second seismic data associated with the monitor seismic survey, wherein the monitor seismic survey is performed later in time than the base seismic survey; estimating subsurface reflection-points and incidence angles associated with the 4D project; determining 4D-binning based on the estimated reflection-points and incidence angles; and maximizing the similarity between the first seismic data and the second seismic data of the 4D project by using the 4D-binning.

According to another exemplary embodiment, there is a computing device for increasing a similarity between a base seismic survey and a monitor seismic survey of a same surveyed subsurface during a 4-dimensional (4D) project. The computing device includes an interface configured to receive first seismic data associated with the base seismic survey and second seismic data associated with the monitor seismic survey, wherein the monitor seismic survey is performed later in time than the base seismic survey; and a processor connected to the interface. The processor is configured to estimate subsurface reflection points and incidence angles associated with the 4D project, determine 4D-binning based on the estimated reflection points and incidence angles subsurface, and maximize the similarity between the first seismic data and the second seismic data of the 4D project by using the 4D-binning.

According to yet another embodiment, there is a method for maximizing a repeatability between a base seismic survey and a monitor seismic survey of a same surveyed subsurface during a 4-dimensional (4D) project. The method includes receiving first seismic data associated with the base seismic survey; receiving second seismic data associated with the monitor seismic survey, wherein the monitor seismic survey is performed later in time than the base seismic survey; wavefield separating at least one of the first seismic data and the second seismic data into upgoing and downgoing data; redatuming the upgoing and/or the downgoing data to a target datum; estimating reflection points and incidence angles based on the redatumed upgoing and/or downgoing data; 4D-binning the first seismic data and the second seismic data based on the reflection points and the incidence angles; and maximizing the repeatability between the first seismic data and the second seismic data of the 4D project by using the 4D-binning.

According to still another embodiment, there is a computing device for maximizing a repeatability between a base seismic survey and a monitor seismic survey of a same surveyed subsurface during a 4-dimensional (4D) project. The computing device includes an interface for receiving first seismic data associated with the base seismic survey and second seismic data associated with the monitor seismic survey, wherein the monitor seismic survey is performed later in time than the base seismic survey; and a processor connected to the interface. The processor is configured to wavefield separate at least one of the first seismic data and the second seismic data into upgoing and downgoing data, redatum the upgoing and/or the downgoing data to a target datum, estimate reflection points and incidence angles based on the redatumed upgoing and/or downgoing data, 4D-bin the first seismic data and the second seismic data based on the reflection points and the incidence angles, and maximize the repeatability between the first seismic data and the second seismic data of the 4D project by using the 4D-binning.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 3A-C illustrate midpoint positions of reflected waves recorded with receivers located on streamers and ocean bottom;

FIGS. 4A and 4B illustrate source and receiver data being redatumed at various datums;

FIG. 5 is a flowchart of a method of 4D-binning according to an exemplary embodiment;

FIG. 6 is a flowchart of a method of joint redatuming and 4D-binning according to another exemplary embodiment;

FIG. 9 is a flowchart illustrating a novel method for 4D-binning according to an exemplary embodiment;

DETAILED DESCRIPTION

Figure 1:
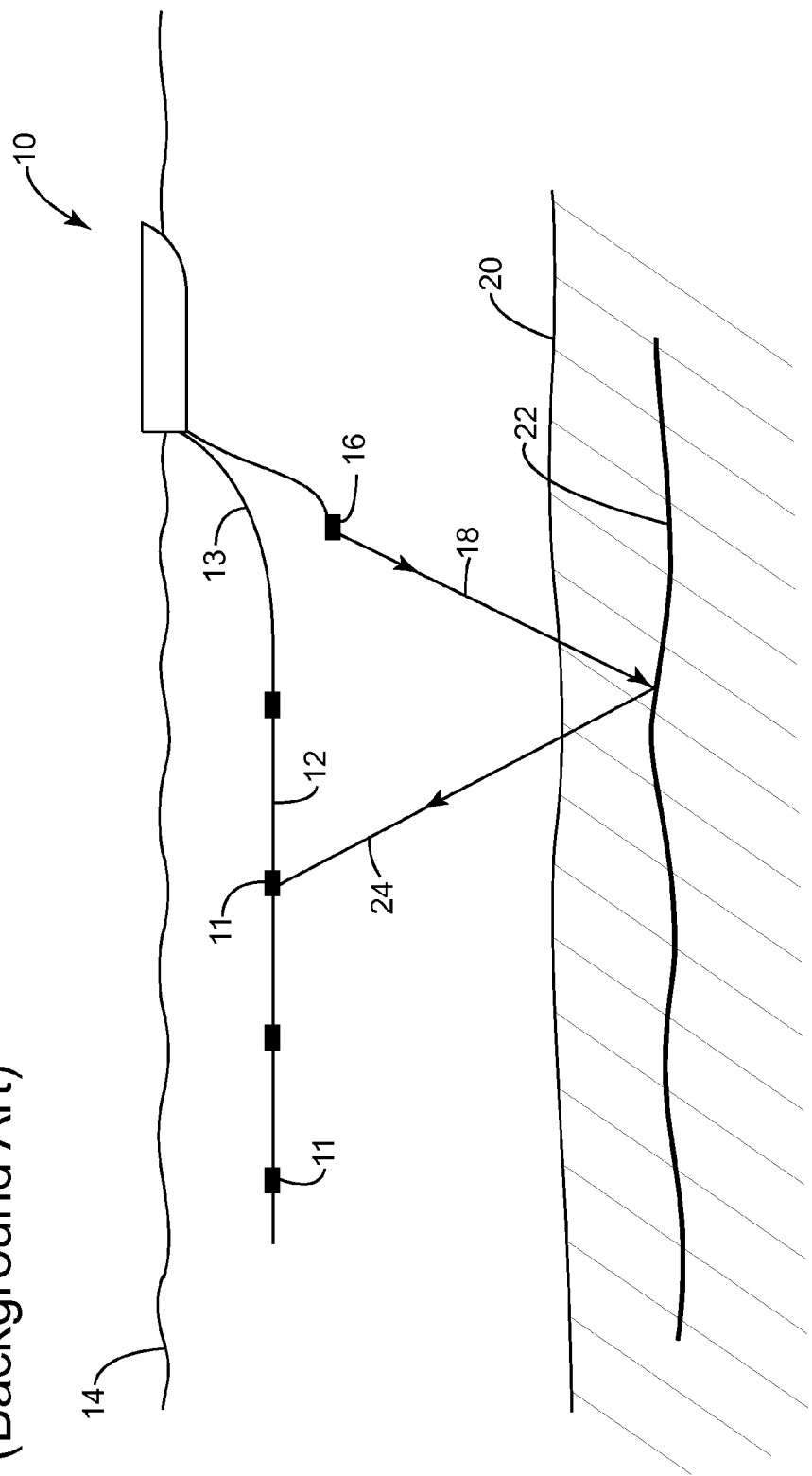
FIG. 1 is a schematic diagram of a conventional seismic data acquisition system having plural seismic receivers on streamers.
Figure 2:
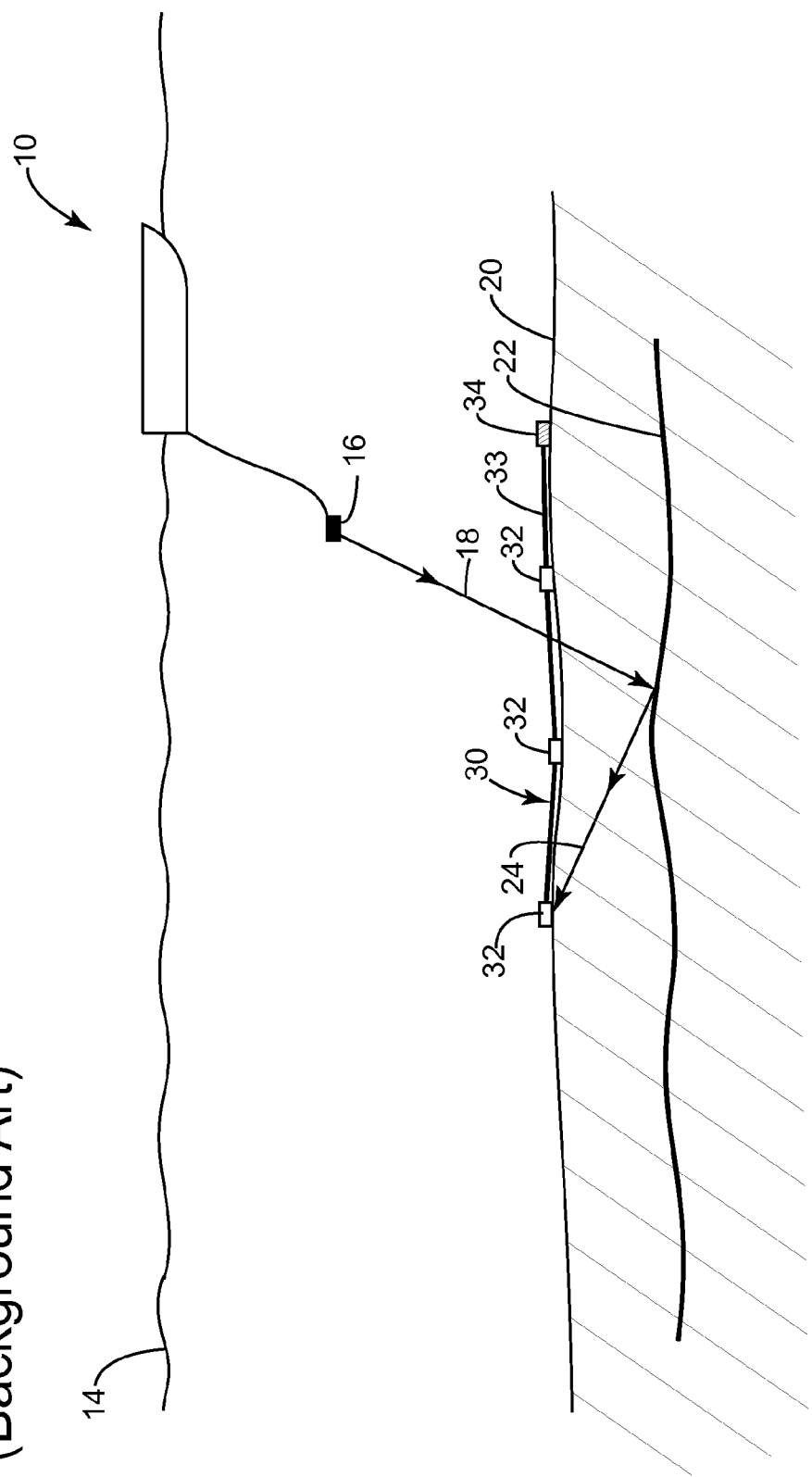
FIG. 2 is a schematic diagram of a conventional seismic data acquisition system having plural seismic receivers located at the ocean bottom.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to seismic data collected during a base survey and a monitor survey, wherein the base survey was conducted with streamers having hydrophones recording only pressure and the monitor survey was conducted with ocean bottom nodes (OBNs) recording X, Y, and Z displacements. However, the embodiments to be discussed next are not limited to these kinds of surveys. For example, the novel embodiments may be applied to a base survey conducted with OBNs and a monitor survey conducted with streamers.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

A step that impacts the image quality of a time lapse seismic survey is the process of gathering or selecting the data of base and monitor surveys in such a way as to maximize the similarity of information content and wavefield sampling between them. It is common practice to achieve this with 4D-binning. 4D-binning may be defined as a process in which traces from the base and monitor surveys are selected for further processing if they satisfy a criterion or criteria designed to assess their degree of similarity. In other words, the 4D-binning process selects the most compatible data for 4D processing. Traces are selected from all of the vintages making up the 4D dataset which are best matched in terms of source, receiver and midpoint position, offset and/or azimuth.

Terminology related to the 4D-binning process is now briefly discussed. A distance between a source and a receiver for a given trace is called the "offset." The spatial position of a point midway between the position of the source and the position of the receiver is called the "midpoint." During a 3D seismic survey, a regular spatial grid is defined, and all traces having midpoints falling within a given 3D cell of the spatial grid are defined as being co-located. The interval between the smallest and largest offset is divided into a set of so-called "common offset bins." Ideally, a 3D seismic survey contains, for a given 3D cell, a trace for each common offset bin. During seismic processing, the recorded seismic dataset may be sorted into "3D common offset cubes." The standard 4D-binning of '486 operates on 3D common offset cubes.

In the case of baseline and monitor surveys with very different acquisition datums (e.g., towed-streamer versus ocean-bottom data where the water depth is more than a few hundred meters), 4D-binning by surface attributes such as geographic shot and receiver positions provides a poor match between traces of the baseline and monitor surveys for the reasons discussed in the Background section. The accuracy of 4D-binning can be improved by estimating the properties of the baseline and monitor wavefields in the subsurface and then modifying the 4D-binning approach as described later. The estimation of subsurface properties can be made (i) by modelling the baseline and monitor wavefields in their acquisition geometries, or by (ii) re-datuming either the shots or receivers or both in the baseline or monitor surveys to a more convenient datum at which the subsurface properties can be more easily or more accurately estimated. In each case, the 4D-binning approach is then modified to select trace pairs with similar estimated subsurface properties (e.g., reflection point and incidence angle). The method is applicable to surveys acquired with sparse source or receiver arrays by combining parts (i) and (ii). Thus it is possible to jointly use re-datuming and modified 4D binning as described later.

Wavefield re-datuming is a widely used technique, see for example, Wapenaar et al., (1992, "Elastic redatuming of multicomponent seismic data," Geophysical Prospecting, the entire content of which is incorporated herein by reference). Given a seismic survey that samples an acoustic or elastic wavefield with sources placed on a source datum and receivers placed on a receiver datum, the purpose of re-datuming is to calculate the wavefield that would have been recorded by a survey with sources and/or receivers placed on datums different to those of their acquisition datums. Common applications of re-datuming discussed in the literature include the correction of near-surface statics, seismic data migration, multiple modelling, and velocity analysis.

Duffaut et al. (2003, "Processing of OBC and surface seismic data for reservoir monitoring at Statfjord field," EAGE) discloses redatuming of receivers from ocean-bottom cables (OBC) to the sea-surface in the context of shallow water 4D monitoring using towed-streamer and OBC data. The 4D processing then proceeds by selecting common ranges of azimuth and offset between the towed-streamer and re-datumed OBC data using a static binning approach (selecting traces nearest the centre of azimuth and offset classes—i.e., this is different from 4D-binning). In their application, the re-datuming is achieved with a phase shift representing movement of the receivers from the sea-bed to the sea-surface in water depths of a few hundred meters. The re-datuming and subsequent static binning in this case may work adequately for water depths of a few hundred meters or less, but becomes inaccurate as the distance over which the data are re-datumed becomes large. In particular, where the ocean-bottom data are recorded with sparse receivers (it is common for ocean-bottom nodes, OBN, to be deployed on a sparse grid, or for ocean-bottom cables to be deployed with large receiver-line spacing), aliasing in the shot domain prevents the accurate re-datuming of receivers from the sea-bed to the sea-surface.

To improve 4D-binning for the first method, each trace in the baseline and monitor datasets are assigned a reflection point and incidence angle calculated by considering primary reflection raypaths returning from a target horizon. The primary raypaths can be modelled by ray-tracing for any acquisition geometry, such as towed-streamer, OBN upgoing, or OBN downgoing geometry, as illustrated in FIGS. 3A-C. The ray-tracing provides spatial locations of reflections on the target horizon and the angle of incidence of the specular ray on the target horizon for each shot and receiver combination. A specific example is discussed later to exemplify how to calculate these quantities.

The reflection points can be assigned a spatial bin on some geometric grid (as discussed above), which is then written into the trace headers along with the modeled incidence angle and the angle class in which it falls. This is incidence-angle binning to form common angle classes. Having ray-traced for each shot and receiver pair in the baseline and monitor surveys, subsequent 4D-binning inputs traces from the baseline and monitor in common incidence-angle classes, and selects trace pairs with the same reflection-point bin. Where a choice needs to be made from a number of traces with the same incidence-angle and reflection-point bin, standard 4D-binning criteria such as cross-correlation may be used.

The use of modeled reflection point and incidence angle allows traces from different shot and/or receiver datums to be matched inside 4D-binning as illustrated in FIGS. 4A-B. FIG. 4A shows a source 400, an OBN downgoing wave 402 recorded by receiver 404, an upgoing wave 406 recorded by a receiver 408 located on a streamer, and an OBN mirror receiver 408 that records an OBN downgoing wave 410. Receiver 408 is the same as receiver 404 but drawn in a position reflected around the sea-surface. This is referred to as the mirror position, or mirror datum. Similarly, wavefield 402 is the same as wavefield 410 but drawn in the mirror geometry. FIG. 4B shows some of the elements shown in FIG. 4A and a redatumed OBN wave 414 recorded at a mirror receiver 412 and with shots re-datumed to the mirror datum 413. The re-datumed shot is drawn at the seabed datum 417, and in the equivalent mirror position 415. The figures also indicate the source (SRC) datum and the receiver (RCV) datum.

For a better understanding of the exemplary embodiments, next is considered the problem of time-lapse processing using Towed-Streamer (TS) data as a baseline, and deep-water, sparse, Ocean-Bottom Node (OBN) data as a monitor. However, the novel methods of the exemplary embodiments may be applied to other types of data.

Considering the TS and OBN data, differences in acquisition geometry are illustrated in FIGS. 3A-C and, therefore, wavefield sampling between TS and OBN are significant. The need for matching OBN to TS data can occur when, for example, production infrastructure is installed between the baseline and monitor surveys, or when infrastructure safety zones are expanded. Where these obstacles arise, submersible vehicles are able to position OBN receivers beneath the obstacle to provide a full record of the monitor wavefield. Because OBN data are also desirable for high-quality imaging (with low ambient noise levels, broad bandwidth, full azimuth and long-offset), this may lead to the choice of OBN over TS surveys for a planned time-lapse campaign. However, often the baseline is formed from a dataset shot with TS geometry. In another application, the 4C receivers may be placed on underwater autonomous vehicles (UAVs) and the monitor survey may be performed with the AUVs The modified 4D-binning method may include steps for estimating the subsurface illumination. For this method, no re-datuming is necessary. As illustrated in FIG. 5, in step 500 it is possible to estimate reflection points (illustrated in FIGS. 3A-C) for base and monitor surveys using ray-tracing or approximate (e.g., straight ray) calculations to target depths. Similarly, it is possible to estimate the incidence angle of rays at a target horizon. In step 502, the method assigns spatial bin locations to the estimated reflection points and class numbers to the estimated incidence angles. In step 504, the data is 4D-binned by selecting traces from baseline and monitor datasets that have common estimated reflection-point bins and incidence-angle classes. Further criteria, such as cross-correlation, may be used to assess trace similarity where there is a choice of multiple traces in the same bin. Then, if necessary, apply in step 506 further processing for noise and multiple attenuation. Once these steps are completed, processing of the data can proceed with traditional 3D or 4D processing sequence in step 508, that may include migration among other algorithms. Then, in step 510, a final image of the surveyed substrate may be generated.

The 4D-binning strategy discussed with regard to FIG. 5 may be further improved by re-datuming shots and/or receivers from one of the surveys to a more convenient datum. For example, where sparse ocean-bottom nodes are used as a monitor survey to be matched to a towed-streamer baseline survey, the shots may be re-datumed to the average mirror datum (the mirror datum is the reflection of the seabed about the sea-surface). For this event, the mid-point more closely represents the reflection point and 4D-binning can proceed with estimated angle classes and using mid-points to spatially associate traces from the towed-streamer and re-datumed OBN surveys. This approach improves the accuracy of reflection-point estimation because the mid-point is an estimate of reflection point for horizons at all depths.

Accurate re-datuming of the OBN data in this example is possible by first separating the OBN wavefield into upgoing and downgoing components. Note that either the source data or the receiver data or both may be redatumed. In one application, if the source is at a first datum and the receivers are at a second datum, the source and receiver data may be re-datumed at a third datum. It is known that the final results of 4D processing are highly dependent on the ability to replicate source and receiver locations between base and monitor surveys, because this ensures some degree of similarity in subsurface illumination.

According to an exemplary embodiment, the novel redatuming-based algorithm may include, as illustrated in FIG. 6, the following steps. In step 600, perform wavefield separation of the dataset to be redatumed, forming upgoing and downgoing wavefields. The dataset may be the source dataset or the receiver dataset. The dataset may belong to the baseline survey or to the monitor survey. Alternatively and/or optionally, separately re-datum the upgoing and downgoing wavefields to the target datum or to a mirror of the target datum to model the surface ghost. Either discard one of the re-datumed wavefields, or sum together to produce a final re-datumed dataset. In the following, by receiver data it is understood data recorded with receivers on the streamer or the ocean bottom node or cable. By source data, it is understood a signal generated by the source, e.g., near-field signature, far-field signature, etc.

In step 602, estimate reflection points and incidence angles at a target horizon by ray-tracing in the re-datumed geometries for which 4D binning will take place. In step 604, assign spatial bin locations to the estimated reflection points and class numbers to the estimated incidence angles. Then, in step 606, conduct 4D-binning by selecting traces from baseline and monitor surveys that have common estimated reflection-point bins and incidence-angle classes. Optionally, further criteria such as cross-correlation may be used to assess trace similarity where there is a choice of multiple traces for the same bin.

In step 608, noise and/or multiple attenuation procedures may be applied to reduce the noise and remove multiples. In step 610, various 3D or 4D processing methods may be used, e.g., migration. In step 612, the final image of the surveyed subsurface is generated.

Figure 7:
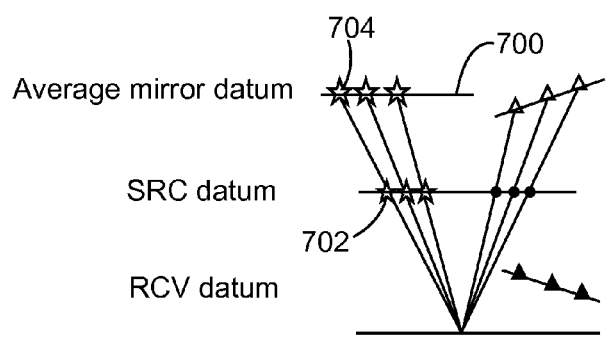
FIG. 7 illustrates a redatum to a desired datum for source and receiver data according to an exemplary embodiment.

When the survey to be re-datumed is sparse in the shot or receiver domain, aliasing in that domain prevents the accurate re-datuming of receivers or shots. For example, shot-domain aliasing prevents accurate re-datuming of receivers and vice-versa. In this case, the target datum could be the mirror surface (or average mirror surface) 700, to which original shots 702 are re-datumed as shots 704 as illustrated in FIG. 7. The novel 4D-binning strategy discussed above thus, compares towed-streamer traces at the near-surface datum with re-datumed traces at the mirror datum.

The novel method illustrated in FIG. 6 uses subsurface wavefield modelling to conduct 4D-binning using estimated reflection points and incidence angles. This novel approach improves the accuracy of the match achieved by 4D-binning of datasets with different source and receiver datums.

The novel algorithms advantageously compensate for differences in acquisition geometries between baseline and monitor surveys when matching the two surveys using 4D-binning (in data processing before migration). The 4D-binning selects subsets of the baseline and monitor datasets by decimation to a common information level. Subsequent images produced by migrating the baseline and monitor data after accurate 4D-binning are more similar and the level of 4D noise (image differences for parts of the Earth with no fluid production) is therefore reduced.

It is expected that traditional migration of baseline and monitor data that have undergone 4D-binning without use of subsurface wavefield modelling as described here would give rise to stronger 4D noise. This is at least partly due to differences between subsurface illumination of the decimated baseline and monitor surveys and the differences of wavefield sampling that lead to different manifestations of aliasing in image processing. When subsurface modelling is conducted and used in 4D-binning as described in the exemplary embodiments, the subsurface illumination and wavefield sampling of the two decimated datasets are more accurately matched. The level of undesired 4D noise in the migrated images is thus reduced such that differences between migrated base and monitor surveys will more closely represent changes in Earth properties due to fluid production.

One specific example of redatuming to facilitate 4D processing of baseline and monitor surveys is now discussed. According to an exemplary embodiment, subsurface wavefield properties for a towed-streamer (TS) baseline survey and sparse ocean-bottom node (OBN) monitor survey are estimated by straight-ray tracing to a target horizon through a flat homogenous Earth. For the towed-streamer data with shot positions $S^{TS}=(S_x^{TS}\ S_y^{TS})^T$ and receiver positions $R^{TS}=(R_x^{TS}\ R_y^{TS})^T$, where superscript-T indicates transpose, on the same (or very close) datum, the estimated reflection-point's position is the mid-point's position E, given by:

$$E^{TS}=(S^{ST}+R^{TS})/2. \quad (1)$$

For a scalar offset $$f = [(R^{OBN} - S^{OBN})^T \cdot (R^{OBN} - S^{OBN})]^{\frac{1}{2}}$$

and a target horizon of depth $h_2$, the estimated incidence angle, $\theta^{TS}$, is given by $$\tan\theta^{TS}=f/2h_2. \quad (2)$$

The upgoing and downgoing OBN wavefields have estimated reflection points expressed as a shift from the mid-point d, written in terms of the vector offset $f=(R^{OBN}-S^{OBN})$ for OBN shot and receiver coordinates $S^{OBN}$ and $R^{OBN}$. The shift from the mid-point is given by:

$$d^{UP}=-h_1f/(2h_2-h_1) \quad (3)$$

for the upgoing, and $$d^{DWN}=h_1f/(2h_2+h_1) \quad (4)$$

for the downgoing. In these equations, $h_1$ is the receiver's depth below the shot datum (depth below the sea surface). The estimated incidence angles, $\theta^{UP}$ and $\theta^{DWN}$ are given by:

$$\tan\theta^{UP}=f/(2h_2-h_1) \quad (5)$$

for the upgoing, and $$\tan\theta^{DWN}=f/(2h_2+h_1) \quad (6)$$

for the downgoing.

Reflection-points for the towed streamer and OBN traces may be assigned using equations (1)-(6) with constant values for $h_1$ and $h_2$. More sophisticated ray-tracing through an anisotropic, heterogeneous Earth model to an arbitrary horizon may provide a more accurate estimate of reflection points and incidence angles at the target horizon. As noted above, this is just an example and the novel methods are applicable to any model that calculates the reflection-points and the incidence angles.

The process of 4D-binning the towed-streamer and OBN data now requires the separation into common angle classes using the values of $\theta$. Each angle class is input to the 4D-binning after sorting the traces into common spatial bins defined by the estimated reflection points. The 4D-binning process selects trace pairs, one from the baseline and one from the monitor, for each spatial bin and each angle class.

Figures 8A, 8B, 8C, 8D:
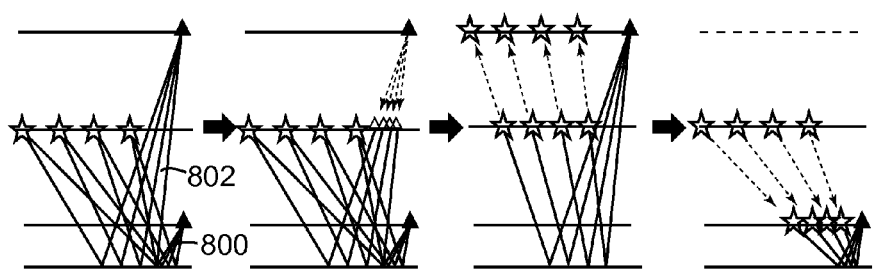
FIGS. 8A-D illustrate various redatum possibilities for depending on the sparsity of the data according to an exemplary embodiment.

According to an exemplary embodiment, the 4D-binning process may be improved by estimating incidence angles and reflection-points after re-datuming to a more convenient shot or receiver datum as illustrated in FIGS. 8A-D. Wavefield separation of OBN data provides data for the upgoing wavefield 800 and data for the downgoing wavefield 802 as illustrated in FIG. 8A. After wavefield separation, the wavefield can be more accurately re-datumed on the receiver side. Both data are represented in this case by specular rays of primary reflections. The best re-datuming for 4D-binning with towed-streamer data is a movement of the receivers from either the seabed or the mirror datum to the sea-surface as illustrated in FIG. 8B. However, for the case of a sparse OBN monitor survey, for example, aliasing in the shot domain requires the re-datuming of shots to the mirror datum (the reflection of the sea-bed about the sea-surface), or to the sea-bed. The former could use the downgoing OBN wavefield as input to provide data with shots and receivers at a common datum at the mirror position as illustrated in FIG. 8C. The latter could use the upgoing OBN wavefield as input to provide data with shots and receivers at a common datum at the sea-bed as illustrated in FIG. 8D.

When many shots and receivers are to be carried forward to signal and image processes after 4D-binning, the target datum for re-datuming is the average mirror datum (see FIG. 7), or average sea-bed datum. The use of an average mirror or sea-bed datum improves the 4D-binning process by reducing the elevation difference between shots and receivers ($h_1 \rightarrow 0$) such that subsurface reflection points can be estimated more accurately by equations (1) to (6). The single output datum at the average mirror or average sea-bed position also allows efficient migration of the data, because the source-side ray-tracing is then done only once to shots on the average surface achieved by re-datuming.

In the current embodiment, the OBN downgoing wavefield just above the sea-bed is calculated using the pressure (P) and vertical component (Z) data from an ocean-bottom multi-component receiver (e.g., a hydrophone that determines the pressure and a geophone that determines 3D displacement). After appropriate calibration of the vertical geophone, the downgoing wavefield is given by $$D = \frac{1}{2}P + \frac{\rho}{2k_z}Z, \quad (7)$$

where $k_z$ is the vertical wavenumber and $\rho$ is the density of the water. The upgoing is given by $$U = \frac{1}{2}P - \frac{\rho}{2k_z}Z. \quad (8)$$

Having performed wavefield separation according to equations (7) and (8), the re-datumed wavefield $D_r$, can be calculated by wavefield extrapolation in the 3D tau-px-py domain. This is achieved by applying a phase shift according to:

$$D_r=De^{-j\Sigma_i k_{zi}\Delta z_i}, \quad (9)$$

where $j=\sqrt{-1}$ is the imaginary number, $\Delta z_i$ is a depth step for which the vertical wavenumber is also known in that step, and where $\Sigma_i \Delta z_i=\Delta z$ is the total vertical shift between the input and output datum.

Similar equations may be written for the up-going signal, and this is true for both the source and receivers. The redatumed wavefields are then used in 4D binning using estimated reflection-points and incidence angles. Subsequently, traditional processing algorithms are used to calculate final images of the surveyed subsurface and the 4D difference.

Various methods that redatum and/or bin seismic data are now presented. According to a first method illustrated in FIG. 9, there is a method for maximizing repeatability between a base seismic survey and a monitor seismic survey of a same surveyed subsurface during a 4-dimensional (4D) project. The method includes a step 900 of receiving first seismic data associated with the base seismic survey; a step 902 of receiving second seismic data associated with the monitor seismic survey, wherein the monitor seismic survey is performed later in time than the base seismic survey; a step 904 of estimating subsurface coverage and illumination; a step 906 of determining 4D binning based on the estimated subsurface coverage and illumination; and a step 908 of maximizing the repeatability between the first seismic data and the second seismic data of the 4D project by using 4D binning.

The step of estimating the subsurface coverage and illumination may include estimating reflection points for the base and monitor surveys using ray-tracing to target depths, and estimating incidence angles of rays at the target. The step of determining the 4D binning may include binning the first seismic data and the second seismic data so that spatial bins are representative of the reflection points, wherein traces are gathered according to their estimated reflection-point bins and incidence angles. The method may also include a step of selecting trace pairs from the first seismic data and the second seismic data using criteria that include similarity of the reflection-point bins and incidence angles, and/or a step of processing the 4D binned data, and generating an image of the surveyed subsurface.

Figure 10:
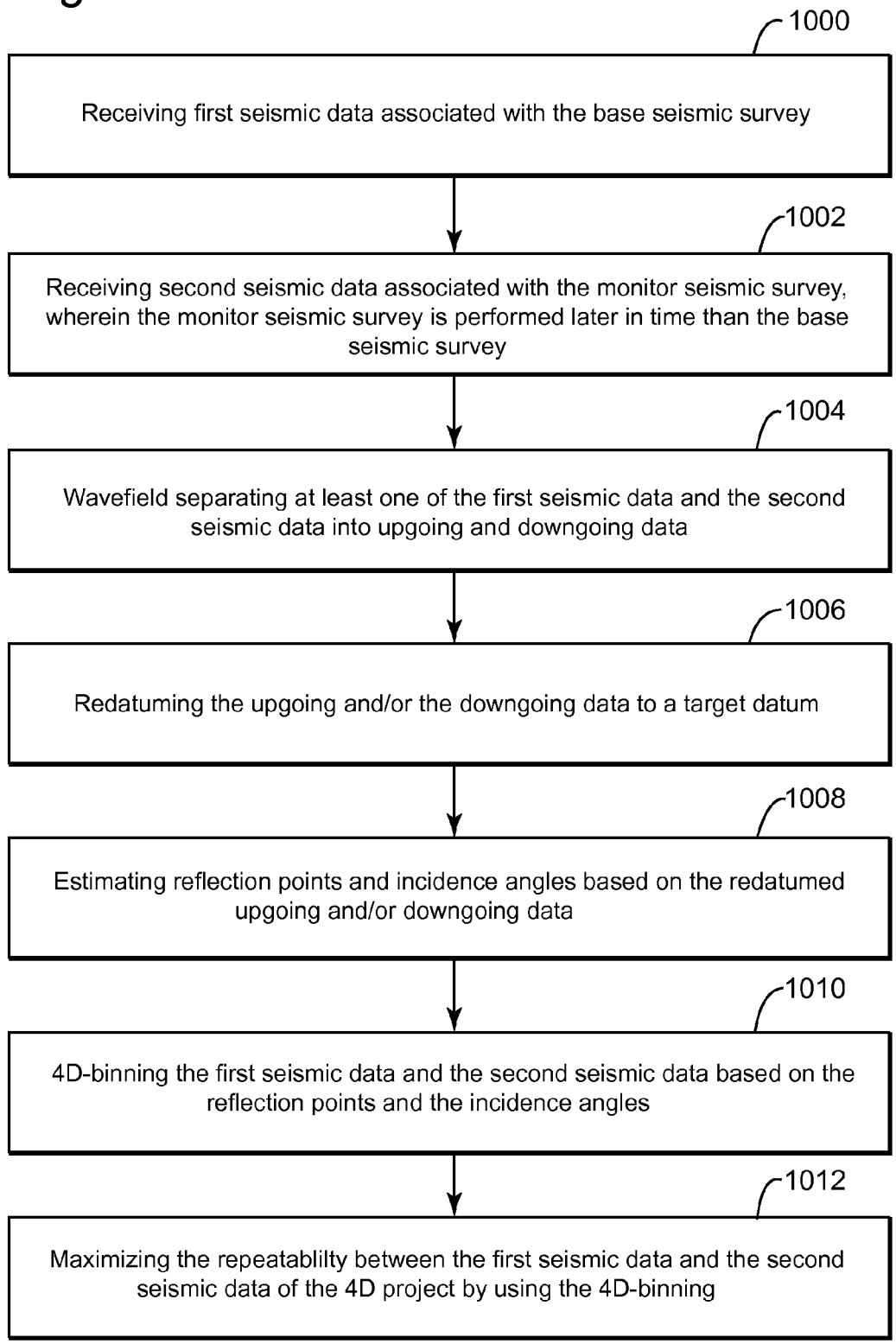
FIG. 10 is a flowchart illustrating a novel method for jointly redatuming and 4D-binning according to an exemplary embodiment.

According to another exemplary embodiment illustrated in FIG. 10, there is a method for maximizing a repeatability between a base seismic survey and a monitor seismic survey of a same surveyed subsurface during a 4-dimensional (4D) project. The method includes a step 1000 of receiving first seismic data associated with the base seismic survey; a step 1002 of receiving second seismic data associated with the monitor seismic survey, wherein the monitor seismic survey is performed later in time than the base seismic survey; a step 1004 of wavefield separating at least one of the first seismic data and the second seismic data into upgoing and downgoing data; a step 1006 of redatuming the upgoing and/or the downgoing data to a target datum; a step 1008 of estimating reflection points and incidence angles based on the redatumed upgoing and/or downgoing data; a step 1010 of 4D-binning the first seismic data and the second seismic data based on the reflection points and the incidence angles; and a step 1012 of maximizing the repeatability between the first seismic data and the second seismic data of the 4D project by using the 4D-binning.

The step of redatuming includes separating the first and/or second seismic data into up-going and down-going wavefields, redatuming the up-going wavefields to its target datum, redatuming the down-going wavefields to its target datum, and recombining the redatumed up-going and down-going fields or discarding one such field. The step of determining the 4D binning includes estimating reflection points for the base and monitor surveys using ray-tracing to target depths, and estimating incidence angles of rays at the target. The step of determining the 4D binning further includes binning the first seismic data and the second seismic data so that spatial bins are representative of the reflection points, wherein traces are gathered according to their estimated reflection-point bins and incidence angles.

The method further includes selecting trace pairs from the first seismic data and the second seismic data using criteria that include similarity of the reflection-point bins and incidence angles, or processing the 4D binned data, and generating an image of the surveyed subsurface.

Figure 11:
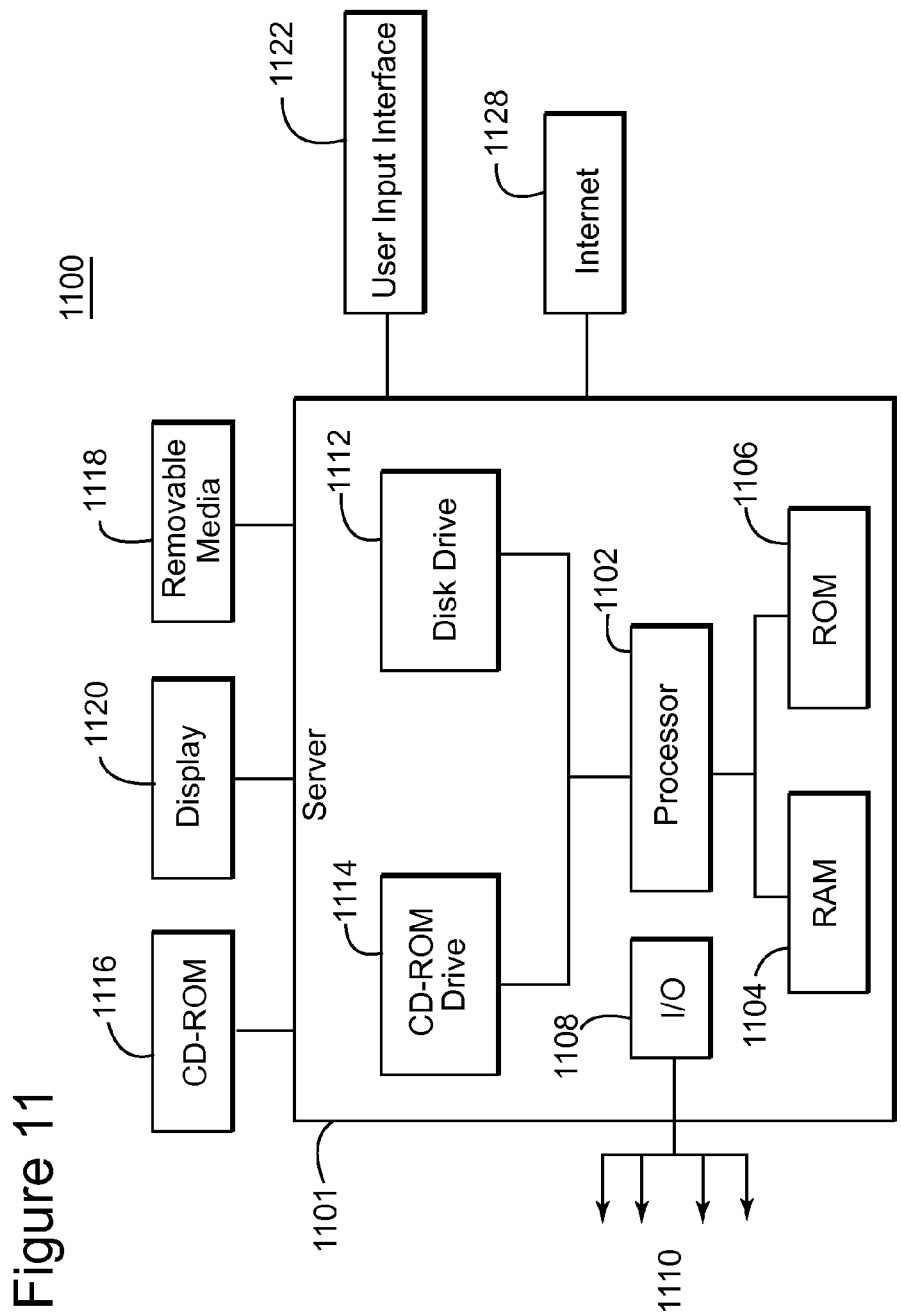
FIG. 11 is a schematic diagram of a computing device for implementing the above methods.

An example of a representative computing device capable of carrying out operations in accordance with the exemplary embodiments discussed above is illustrated in FIG. 11. Hardware, firmware, software or a combination thereof may be used to perform the various steps and operations described herein.

The exemplary computer device 1100 suitable for performing the activities described in the exemplary embodiments may include server 1101. Such a server 1101 may include a central processor unit (CPU) 1102 coupled to a random access memory (RAM) 1104 and to a read-only memory (ROM) 1106. The ROM 1106 may also be other types of storage media to store programs, such as programmable ROM (PROM), erasable PROM (EPROM), etc. The processor 1102 may communicate with other internal and external components through input/output (I/O) circuitry 1108 and bussing 1110 to provide control signals and the like. The processor 1102 carries out a variety of functions as are known in the art, as dictated by software and/or firmware instructions.

The server 1101 may also include one or more data storage devices, including hard disk drives 1112, CD-ROM drives 1114, and other hardware capable of reading and/or storing information such as a DVD, etc. In one embodiment, software for carrying out the above-discussed steps may be stored and distributed on a CD-ROM or DVD 1116, removable media 1118 or other form of media capable of portably storing information. These storage media may be inserted into, and read by, devices such as the CD-ROM drive 1114, the drive 1112, etc. The server 1101 may be coupled to a display 1120, which may be any type of known display or presentation screen, such as LCD or LED displays, plasma displays, cathode ray tubes (CRT), etc. A user input interface 1122 is provided, including one or more user interface mechanisms such as a mouse, keyboard, microphone, touch pad, touch screen, voice-recognition system, etc.

The server 1101 may be coupled to other computing devices via a network. The server may be part of a larger network configuration as in a global area network (GAN) such as the Internet 1128.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices, or magnetic storage devices such as floppy disk or magnetic tape. Other non-limiting examples of computer-readable media include flash-type memories or other known types of memories.

The disclosed exemplary embodiments provide an apparatus and a method for redatuming and/or binning seismic data from different acquisition datums. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for generating an image of a subsurface formation, the method comprising:
   receiving first seismic data associated with a base seismic survey of the subsurface formation;
   acquiring second seismic data during a monitor seismic survey of the subsurface formation, wherein the monitor seismic survey is performed later in time and with different shot-receiver locations than the base seismic survey;
   estimating subsurface reflection-points and incidence angles for traces in the first seismic data and in the second seismic data;
   binning the first seismic data and the second seismic data so as to gather the traces of the first seismic data and of the second seismic data, in 4-dimensional (4D) bins determined based on the estimated reflection-points and incidence angles; and
   processing the 4D bins to generate the image of the subsurface formation.

2. The method of claim 1, wherein the step of estimating comprises:
   estimating the reflection points for the base and monitor surveys using ray-tracing to target depths; and
   estimating the incidence angles of rays associated with the reflections points at the target depths.

3. The method of claim 1, further comprising:
   selecting trace pairs from the first seismic data and the second seismic data using criteria that include similarity of the reflection-point bins and incidence angles.

4. The method of claim 1, wherein the base seismic survey is a towed-streamer survey and the monitor seismic survey is an ocean-bottom node survey.

5. The method of claim 1, wherein there are geometry differences between the first seismic data and the second seismic data.

6. The method of claim 1, wherein the step of binning is performed before a step of migrating, which is included in the step of processing the 4D binned data.

7. A computing device for generating an image of a subsurface formation, the computing device comprising:
   an interface configured to receive first seismic data associated with a base seismic survey of the subsurface formation, and to acquire second seismic data during a monitor seismic survey of the subsurface formation, wherein the monitor seismic survey is performed later in time and with different shot-receiver locations than the base seismic survey; and
   a processor connected to the interface and configured to, estimate subsurface reflection points and incidence angles for traces in the first seismic data and in the second seismic data,
   bin the first seismic data and the second seismic data so as to gather the traces of the first seismic data and of the second seismic data, in 4-dimensional (4D) bins determined based on the estimated reflection points and incidence angles, and
   process the 4D bins to generate the image of the subsurface formation.

8. The computing device of claim 7, wherein the step of estimating comprises:
   estimating the reflection points for the base and monitor surveys using ray-tracing to target depths; and
   estimating the incidence angles of rays associated with the reflections points at the target depths.

9. A method for maximizing a repeatability between a base seismic survey and a monitor seismic survey of a same surveyed subsurface during a 4-dimensional (4D) project, the method comprising:
   receiving first seismic data associated with the base seismic survey;
   acquiring second seismic data during the monitor seismic survey, wherein the monitor seismic survey is performed later in time and with different shot-receiver locations than the base seismic survey;
   wavefield separating at least one of the first seismic data and the second seismic data into upgoing and downgoing data;
   redatuming the upgoing and/or the downgoing data to a target datum;
   estimating reflection points and incidence angles for traces in the first seismic data and in the second seismic data based on the redatumed upgoing and/or downgoing data;
   4D-binning the first seismic data and the second seismic data so as to gather the traces of the first seismic data and of the second seismic data, in spatial bins defined based on the reflection points and the incidence angles; and
   generating an image of the surveyed subsurface by processing the 4D-binned data.

10. The method of claim 9, wherein the desired target datum is a mirror datum corresponding to a surface that represents a reflection of a surface corresponding to the receivers relative to a surface corresponding to the sources.

11. The method of claim 9, wherein the second seismic data is sparse relative to the first seismic data.

12. The method of claim 9, wherein the step of 4D-binning comprises:
    estimating reflection points and incidence angles for the base and monitor surveys using ray-tracing to target depths in a redatum geometry.

13. The method of claim 11, wherein the base seismic survey is associated with towed-streamers and the monitor seismic survey is associated with ocean-bottom nodes.

14. A computing device for maximizing a repeatability between a base seismic survey and a monitor seismic survey of a same surveyed subsurface during a 4-dimensional (4D) project, the computing device comprising:
    an interface for receiving first seismic data associated with the base seismic survey and for acquiring second seismic data associated with the monitor seismic survey, wherein the monitor seismic survey is performed later in time and with different shot-receiver locations than the base seismic survey; and
    a processor connected to the interface and configured to, wavefield separate at least one of the first seismic data and the second seismic data into upgoing and downgoing data,
    redatum the upgoing and/or the downgoing data to a target datum, estimate reflection points and incidence angles based on the redatumed upgoing and/or downgoing data, 4D-bin the first seismic data and the second seismic data so as to gather traces of the first seismic data and of the second seismic data in bins based on the reflection points and the incidence angles, and generate an image of the surveyed subsurface by processing the 4D-binned data.

15. The computing device of claim 14, wherein the desired target datum is a mirror datum corresponding to a surface that represents a reflection of a surface corresponding to the receivers relative to a surface corresponding to the sources.

16. The computing device of claim 14, wherein the second seismic data is sparse relative to the first seismic data, and the base seismic survey is associated with towed-streamers and the monitor seismic survey is associated with ocean-bottom nodes.

\* \* \* \* \*